United States Patent [19]

Frost

[11] Patent Number: 4,927,119
[45] Date of Patent: May 22, 1990

[54] REVERSIBLE FLOW VALVE FOR AIR ISOLATED BASES

[75] Inventor: Charles Frost, La Verne, Calif.

[73] Assignee: Kimball Industries, Inc., Monrovia, Calif.

[21] Appl. No.: 264,687

[22] Filed: Oct. 31, 1988

Related U.S. Application Data

[63] Continuation of Ser. No. 832,848, Feb. 24, 1986, abandoned.

[51] Int. Cl.$^5$ .............................................. F16M 13/00
[52] U.S. Cl. .................................... 248/550; 248/638; 137/596
[58] Field of Search ............... 248/550, 615, 622, 631, 248/638, 649, 654, 157, 161, 188.3; 52/167; 267/DIG. 1, DIG. 2; 137/596

[56] References Cited

U.S. PATENT DOCUMENTS

| | | |
|---|---|---|
| 1,203,724 | 11/1916 | Gabell . |
| 3,100,101 | 8/1963 | Trevaskis . |
| 3,189,303 | 6/1965 | Boothe . |
| 3,517,696 | 6/1970 | Faure . |
| 3,582,027 | 6/1971 | Hackbarth . |
| 4,061,159 | 12/1977 | Brakel . |
| 4,089,349 | 5/1978 | Schenk . |
| 4,198,025 | 4/1980 | Lowe . |
| 4,222,555 | 9/1980 | Eimen . |
| 4,384,700 | 5/1983 | Thompson . |
| 4,407,400 | 10/1983 | Fichtinger . |
| 4,461,444 | 7/1984 | Grassl . |
| 4,477,045 | 10/1984 | Karasawa . |
| 4,589,620 | 5/1986 | Sakamoto . |

Primary Examiner—Ramon O. Ramirez
Assistant Examiner—Robert A. Olson
Attorney, Agent, or Firm—Louis J. Bachand

[57] ABSTRACT

Vibration equipment bases which are isolated from the floor by air bags are made self-leveling by interposing a valve between each of the air bags and a pressurized air supply and each of the air bags and the atmosphere, the valve being sensitive to height of the base in air flow controlling relation to and from the bags to adjust their inflation and thus the height of the base.

17 Claims, 2 Drawing Sheets

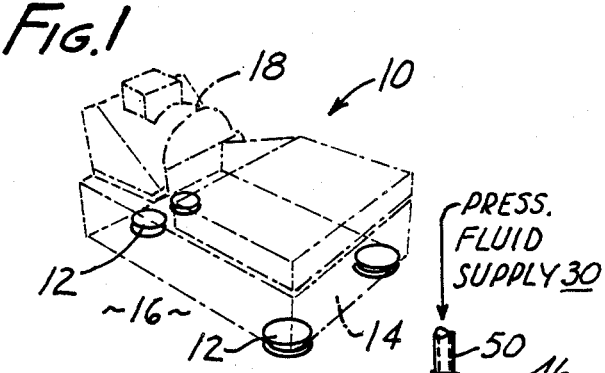
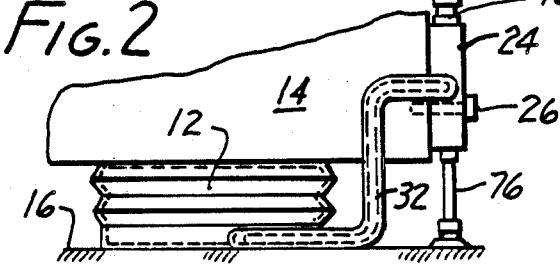
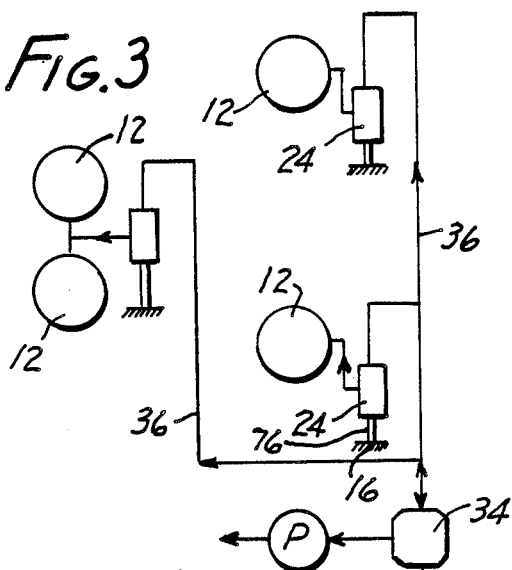
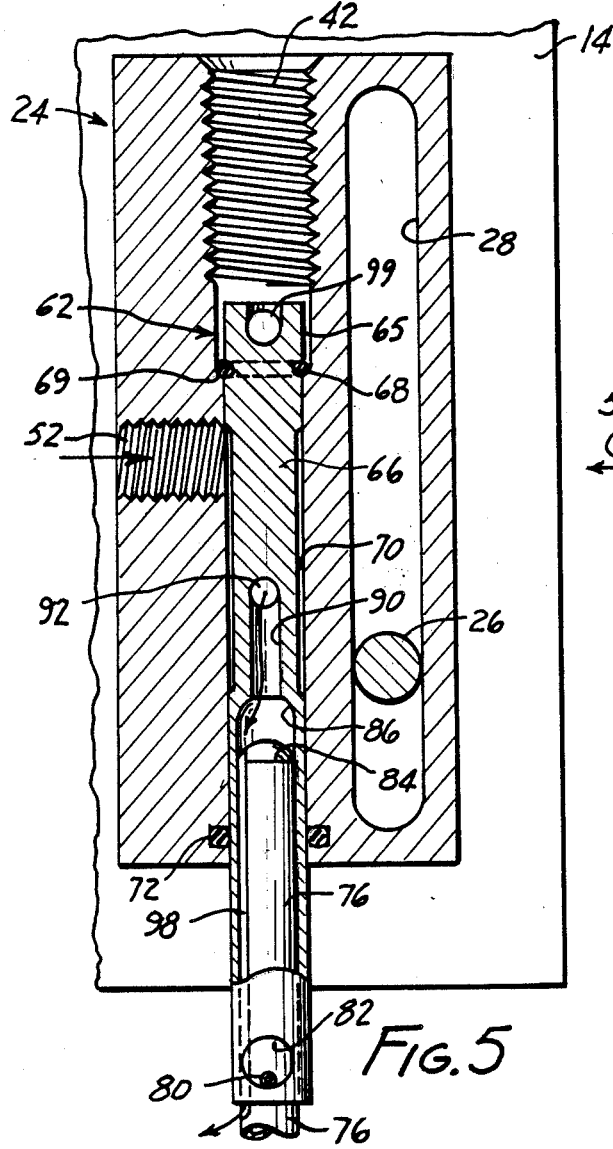
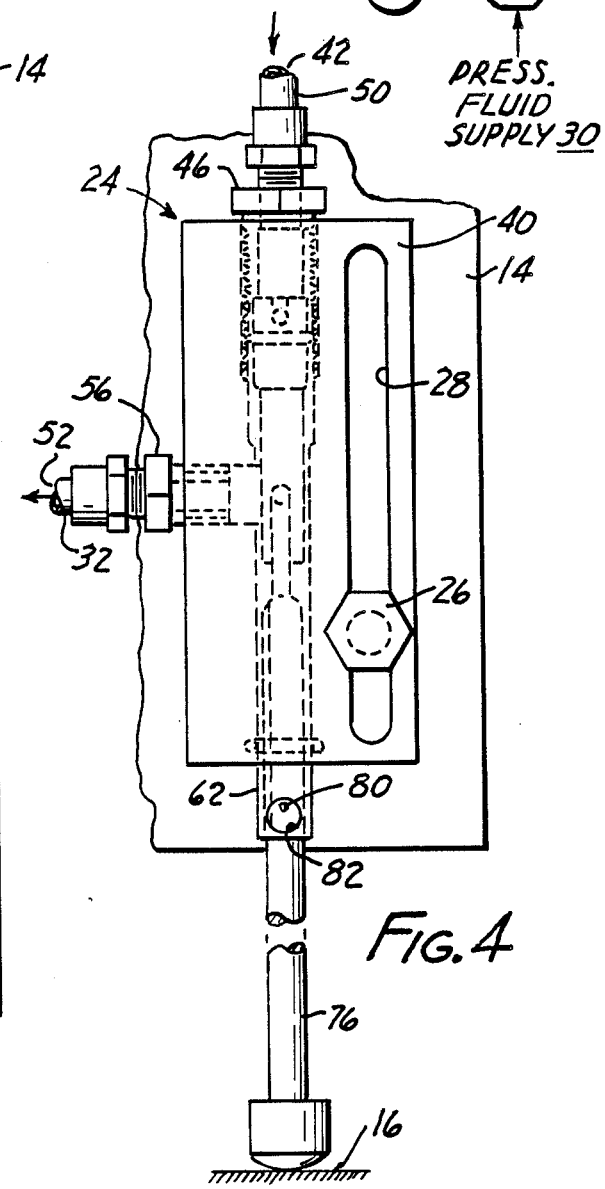

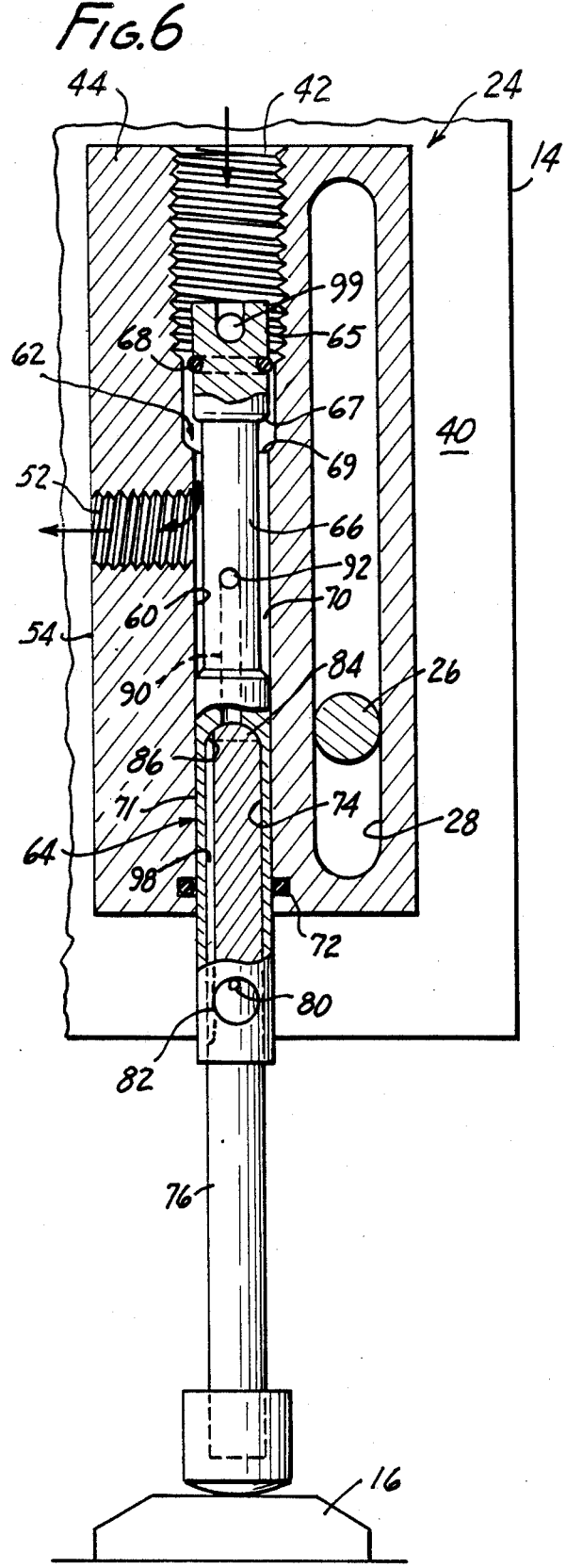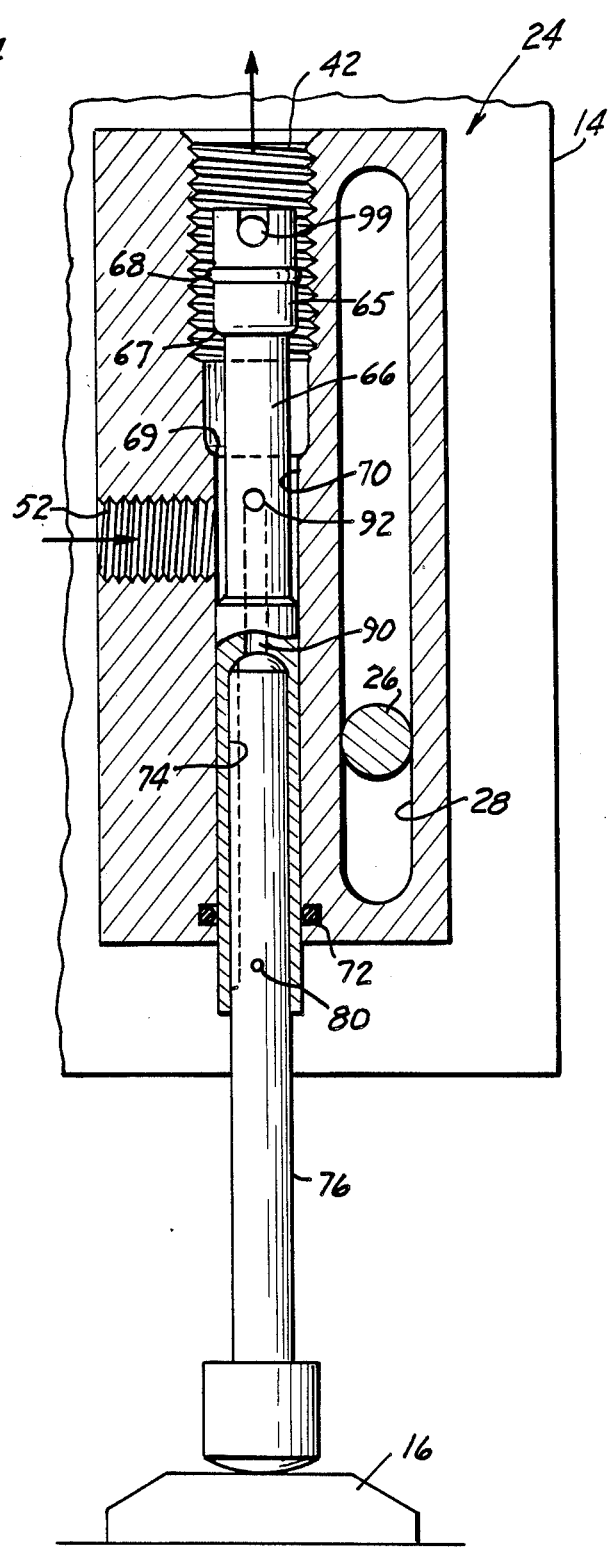

4,927,119

REVERSIBLE FLOW VALVE FOR AIR ISOLATED BASES

This application is a continuation of application Ser. No. 06/832848, filed 2/24/86 now abandoned.

TECHNICAL FIELD

This invention has to do with vibration test equipment, and more particularly with such equipment in which a mass or base at which a vibration assembly of a shaker, slip plate and workpiece is placed for operation is vibration isolated from the supporting floor by interposing air bags or like fluid inflatable structures between the base and the floor. In a particular aspect the invention provides novel valve means which are flow reversible to be self-adjusting responsive to a sensed condition such as the leveling at a predetermined height of all four corners of a base. The invention valve further is reversibly operated for ease of deflating the inflatable structures after use and when moving the base.

BACKGROUND

It is known to isolate a base from the supporting floor by placing air bags distributively around the perimeter of the base to isolate the base vibrations from the floor. A problem with such known air isolated bases is that leveling of the base, which is highly critical to the successful vibration test of the workpiece is only difficultly achieved, since each supporting bag must be adjusted in pressure to the right amount to have the base level overall, and overshooting or undershooting the precise pressure is commonplace, whereby all the bags must be readjusted. In addition, the deflation of the bags is a slow process and consumes an inordinate amount of time when the base is lowered or to be moved.

SUMMARY OF THE INVENTION

It is accordingly an object of the present invention to provide an air isolated base which is self-adjusting to a level condition, automatically. It is another object to provide an air bag or like fluid inflatable structure isolated base in which the individual bags are supplied the pressurized fluid from a common supply but each only according to its need for more fluid by a self-regulating device which relates a sensed height of the base to the need for more or less pressurized fluid. It is yet another object to provide such an air isolated base in which fluid flow is in either direction so that fluid may be added or deleted according to the need to increase or decrease the height of a particular portion of the base. Still another object is to provide novel fluid flow control means which sense the difference between a desired predetermined base height and the actual height and compensates immediately by adding or deleting fluid to bring the base to the desired height. It is still another object to provide in such apparatus means to reverse the flow of pressurized fluid for rapid evacuation of the air bags, and to do so without blocking the valve assembly. It is yet another object to have the fluid flow throttled at the end of the fluid fill for smooth movement of the base.

These and other objects to become apparent hereinafter are realized in accordance with the invention in vibration test apparatus comprising a base, fluid inflatable means isolating the base from the floor, a pressurized fluid supply, and valve means selectively communicating the supply with the fluid inflatable means responsive to the base being less than a predetermined distance from the floor, whereby the base is raised to the predetermined height by further inflation of the fluid inflatable means.

Importantly for the overall flexibility of the apparatus in use, the valve means further includes means selectively communicating the fluid inflatable means with the atmosphere in pressurized fluid supply blocked relation responsive to the base being more than a predetermined distance from the floor, whereby the base is lowered to the predetermined height by deflation of the fluid inflatable means, whereby fluid is added of deleted from the inflatable means or structure.

In particular embodiments: the vibration test apparatus also includes a plurality of inflatable means distributed across the base, and valve means for each the fluid inflatable means, whereby each the inflatable means is independently communicated with the fluid supply by its respective valve for independent height adjustment of the base at each the inflatable means; the inflatable means comprises an air impervious bag adapted to lift and support the base a predetermined distance from the the floor; and the pressurized fluid supply comprises a supply of compressed air.

The invention valve means typically comprises a valve body, a valve stem operable to control fluid flow through the valve body, and means to displace the valve stem relative to the valve body for fluid flow into or out of the inflatable means as a function of the difference between the distance from the base to the floor and the predetermined distance, whereby the base is brought to the predetermined distance. Generally, the valve body defines first and second ports and a fluid passage therebetween having a valve seat formed therein, the first port being in open communication with the pressurized fluid supply, the second port being in open communication with the inflatable means, the valve stem defining a plug selectively cooperating with the valve seat in passage fluid flow blocking relation; the valve stem displacement means comprises a rigid element operatively coupled to the valve stem, the rigid element depending displaceably from the valve body in floor contact shiftable relation, the valve stem plug having seating response to no floor contact of the rigid element to block fluid flow through the passage against further inflation of the inflatable means, and unseating response to floor contact of the rigid element to unblock the passage to fluid flow from the fluid supply to the inflatable means for further inflation of the inflatable means. In particular embodiments of the vibration test apparatus the valve stem defines a flow passage between the inflatable means and the atmosphere, the rigid element being adapted to block the stem passage responsive to the element resting on the floor in inflatable means inflation maintaining relation, and to unblock the stem passage responsive the element being out of contact with the floor in inflation means deflating relation, whereby lifting of the base above the predetermined distance from the floor lifts the rigid element from the floor and opens the stem passage to the atmosphere for deflation of the inflatable means until the predetermined height is reached by lowering the base and the rigid element is in contact with the floor in further fluid flow-blocking relation with the stem passage to stabilize the base at the predetermined height.

In these and like embodiments, there is also provided means to limit the travel of the rigid element relative to the valve stem, preferably the valve stem is differentially dimensioned along its length below the plug for reduced rates of fluid flow responsive to increasing proximity of the plug to the valve seat in throttling relation at the termination of stem travel; and there is also included an O-ring seal sealing the plug at the seat.

As mentioned, the vibration test apparatus may also include subatmospheric pressure means to withdraw fluid from the inflatable means through the valve body passage, e.g. with the valve stem plug being ported against blocking the valve body first port, and in certain embodiments the invention includes also means adjustably securing the valve body to the base; a pressurized air supply as the pressurized fluid supply; and the inflatable means comprising an air impervious bag.

In a highly preferred embodiment, the invention provides a valve for air isolated bases for vibration equipment having air bags selectively maintaining the base a predetermined height from the floor for vibration isolation and a pressurized air supply to the air bags, the valve controlling communication of the fluid supply and the air bags and comprising a valve body having a first port in open fluid supply communication, a second port in open air bag communication, and a valve body passage between the first and second ports defining a valve seat, a valve stem within the passage cooperating with the valve seat to open or close the valve body passage to communication between the first and second ports, a valve stem operator responsive to the height of the base from the floor being less or more than the predetermined height to open or close respectively the valve body passage, whereby air is admitted or not to the bags to maintain the base at the predetermined height from the floor.

Additionally, the invention contemplates provision of a self-adjusting valve for fluid pressure systems comprising a valve body having first and second ports at selectively different fluid pressures and a valve body passage therebetween, the second port being adapted for open communication with a fluid inflatable means desirably kept at a predetermined level of inflation, a valve stem bodily shiftable within the passage, cooperating means defined by the passage and the stem for controlling fluid flow to and from the inflatable means, and means to sense relatively greater or lower inflation of the fluid inflatable means and in response thereto to shift the valve stem to adjust fluid flow to achieve the predetermined level of inflation.

Finally, the invention further contemplates the method of self-regulating the height of all portions of a vibration test base, including distributively supporting the base with inflatable means, selectively first communicating one or more of the inflatable means with a pressurized fluid supply in response to inadequate height of the base at the inflatable means, selectively alternately communicating one or more of the inflatable means with the atmosphere in response to excessive height of the base, and independently sensing the base height at each inflatable means in first or alternate communication determining relation.

THE DRAWING

The invention will be further described as to an illustrative embodiment in conjunction with the attached drawing in which:

FIG. 1 a perspective view of vibration teast equipment with the air isolation bags in place supporting the base;

FIG. 2 is fragmentary view, in side elevation of the air bag and valve assembly on a base;

FIG. 3 is a schematic view of the common pressurized fluid supply to the several leveling valves;

FIG. 4 is a front elevational view, enlarged, of the valve according to the invention;

FIG. 5 is a view in vertical section of the valve in a first flow position to reduce excessive base height;

FIG. 6 is a view like FIG. 5 with the valve in a second flow position to increase inadequate base height; and, FIG. 7 is a view like FIG. 5 with the valve in a third, reverse flow position for withdrawl of air or other fluid.

DETAILED DESCRIPTION

With reference now to the drawings in detail, a typical isolated base apparatus is shown at 10 in FIG. 1, in phantom outline for clarity of view of the air isolation bags 12 located distributively around the perimeter of the base 14. The apparatus 10 comprises the base 14 supported at some predetermined and adjustable height from the floor 16 and surmounted by a shaker 18 coupled to slip plate 20. It is the vibrational energy of the shaker 18 which is sought to be isolated from the floor 16 by interposition of the air bags 12, as shown. It is immediately evident that leveling the base 14 at some predetermined height by adjustment of the inflation of the air bags 12 requires individually and interdependently controlling the several bags 12.

The present invention by providing a height sensing, two-way flow valve, which automatically compensates for deviations up or down from a predetermined height condition greatly facilitates the leveling operation since each air bag is individually adjusted automatically to achieve the predetermined height condition.

In FIG. 2 the air bag 12 is shown in detail to comprise a corrugated cylinder or bellows type bag which is placed between the bottom of the base 14 and the floor 16. The valve of the invention is shown at 24 secured to the base 14 by bolt 26 which is adjustable in slot 28 of the valve (FIG. 5) for setting the predetermined height of the base 14, as will be hereinafter detailed, and broadly for the purpose of controlling the supply of air or other fluid under pressure from the supply 30 to the bag 12 via hose 32.

In FIG. 3 the relationship of the fluid supply 30 to the several valves 24 is shown. Each valve 24 is in continuous open communication with the pressurized fluid supply 30 through regulator 34 and a common manifold 36 and each is operatively associated with one or more air bags 12 for the purpose of admitting or withdrawing air or other fluid therefrom. It will be noted that the air pressure to each valve 24 is the same by virtue of the common manifold 36.

With reference now to FIG. 6, the structure of the valve 24 and its operation at the start-up of the apparatus 10 will be described. The valve 24 is bolted to the base 14 by bolt 26 in slot 28 as mentioned above. The valve 24 comprises a metal valve body 40 of generally rectangular configuration which has a first port 42 at a first end face 44, comprising a tapped hole into which a fitting 46 (see FIG. 4) is threaded for connection of the valve first port to the pressurized fluid supply 30 via hose 50. The valve body 40 further defines a second port 52 in a side face 54, also a tapped hole and into which a fitting 56 is threaded (FIG. 4) for connection of the valve 24 to an air bag 12 via hose 32. The valve body is axially bored to form a passage 60 extending between the first and second ports 42, 52. The passage 60 extends longitudinally through the valve body 40 parallel with the slot 28, coaxial with the first port 42 and normal to the second port 52, as shown. A valve stem 62 is positioned in the passage 60. The valve stem 62 comprises a generally cylindrical body 64 having a plug shaped upper terminus 65, an intermediate barrel portion 66 of somewhat reduced diameter as shown so as to define a clearance 70 between the barrel portion and the surrounding passage 60. Between the plug terminus 65 and the stem barrel portion 66 the stem defines a throttling shoulder 67 which is surmounted by a sealing O-ring 68 partly embedded in the plug terminus and sized to seat upon the valve seat shoulder 69 in the passage 60. The valve stem 62 terminates downwardly in a lower sleeve portion 71 of a diameter which slidably fits within the passage 60 and which is sealed at O-ring 72 in the lower reaches of the passage 60 as shown. The valve stem 62 has an axial bore 74 within the lower sleeve portion 71 sized to slidably receive the valve stem operator 76, a rod-like rigid element which fits partly within the bore 74 and extends downwardly therefrom to act as the height sensor for the valve 24. The valve stem operator is restrained from dropping out of the lower sleeve portion 71 by pin 80 on the operator which extends into hole 82 in the lower sleeve portion against too great movement of the operator relative to the lower sleeve portion. For example, when the valve 24 is raised above the floor 16 a distance such that the operator 76 cannot reach the floor, the pin binds against the lower edge of the hole 82 and keeps the operator in the bore 74. The valve stem operator 76 pushes aganist the valve stem 62 when the operator is in contact with the floor lifting the stem upward and displacing the stem plug upward and the O-ring 68 out of sealing engagement with the valve seat 69. Air or other pressurized fluid is then admitted into the clearance 70 and thence into the second port 52 for delivery to the air bags 12 in inflating relation. It will be noted that the effect of further inflating the air bags 12 is to lift the base 12, and that this concomitantly lifts the valve 24 and thus the valve stem operator 76 whose downward travel is limited by pin 80 and hole 82 as mentioned. When the operator 76 leaves the floor 16, the valve stem 62 is no longer pushed up but falls with its throttle shoulder 67 entering the reduced diameter portion of the passage 60 which defines the clearance 70, in a manner throttling gently the fluid passing to the air bags for a smooth stop to base travel, and ultimately the stem seals at the seat 69 by engagement of the O-ring 68 there. See FIG. 5.

The valve stem operator 76 is rounded at the upper end 84 to congruently interfit the upper end 86 of the bore 74 in sealing relation so as to cut off flow between the clearance 70 and the bore 74, as shown in FIG. 6. It will be noted that the intermediate barrel portion 66 of the valve stem 62 defines a small axial bore 90 terminating in a transverse bore 92 which is in open communication with the clearance 70. These bores 90, 92 are used to vent the air bags 12 to the atmosphere when the height of the base, and thus the valve 24 is such that the valve stem operator does not touch the floor 16, i.e. when the height of the base is too great and it is desirable to lower the base by relieving the pressure in the air bags 12. See FIG. 5.

With reference then to the operation of the valve 24 when the air bags 12 are just first filled, as shown in FIG. 6, the valve 24 is connected to the pressurized fluid supply at port 42. The valve stem 62 is forced downwardly by the fluid pressure until the O-ring 68 seats at seat 69. At start-up the valve stem operator 70 is engaged with the floor 16 and displaces the valve stem 62 upwardly against the fluid pressure. This results in air flow, as shown in FIG. 6 from port 42, through the valve seat 69 into the clearance 70, and thence into the port 52 for delivery to the air bags 12. No air flow occurs through the bore 90, 92 since the upward thrust of the valve stem operator 76 engages the operator with the bore 92 closing the fluid passageway. This condition continues until the air bags 12 are sufficiently filled to lift the base 14 to where the operator 70 no longer touches the floor 16. As the operator 70 leaves the floor 16, the valve stem plug 65 which has been elevated as shown in FIG. 6, descends, first throttling fluid flow as the plug enters the passage way and closes the clearance 70, and then blocking flow as the O-ring 69 seats on seat 69.

It can happen that the air bags 12 become overfilled or it is desired to lower the base some. The invention valve 24 permits ready downward adjustment in height. Importantly, this adjustment is automatic and self-executing. This feature enables the valves 24 themselves to compensate for deviations in the height of the base by automatically releiveing the pressure in the air bags 12 even as the overfil condition is occurring. This is effected by the operator 70 sensing the floor. When the operator 70 is off the floor, indicating too much base height, the operator drops away from contact with the upper end 86 of the bore 74 opening the bore 90, 92 to flow. Since the bores 90, 92 are in open communication with the air bags 12 through the port 52, there is an immediate rush of air or other fluid, which is pressurized, out of the bags, through the port 52, down the bores 90, 92, which have been unblocked by the bodily shifting of the operator 76, through the communicating bore 74 and out to atmosphere along the groove 98 in the operator.

If the relief of the bags 12 is excessive, the resulting contact of the operator 76 with the floor 16 as the base lowers, shuts the flow off at bore 90, displaces the valve stem 62 upward and automatically initiates the fill procedure above described, as so on until the predetermined height of base 14 is reached. Naturally, with all portions of the base having like valves 24 and the valves all connected to a common manifold leading to a common fliud supply, the reactions of the valves to sensed conditions at their location are individual yet interdependent, as all seek the same base height and thus a level base.

A further feature of the present apparatus is the ability to rapidly empty the air bags. With reference to FIG. 7, for this purpose, the valve is connected to a vacuum source, e.g the suction side of a pump (not shown) at port 42. Suction is applied; the air or other fluid is drawn from the air bags 12 through the port 52, backward through the clearance 70 and through the valve seat 69, by virtue of the valve stem 62 being lifted up by the negative pressure in the port 42. Because the plug 65 may abut the fitting 46 the upper end of the plug is provided with a relief bore 99 which extends at right angles in the plug to provide communication between the port. 42 and the passage 60 even with the plug 65 in tight abutment with the fitting 46. See FIG. 4.

The foregoing objects of the invention are met in that the invention provides an air isolated base which is self-adjusting to a level condition, automatically, in which the individual air bags are supplied the pressurized fluid from a common supply but each only according to its need for more fluid by a self-regulating device which relates a sensed height of the base to the need for more or less pressurized fluid, in which fluid flow is in either direction so that fluid may be added or deleted according to the need to increase or decrease the height of a particular portion of the base, in which novel fluid flow control means sense the difference between a desired predetermined base height and the actual height and compensates immediately by adding or deleting fluid to bring the base to the desired height, in which are provided means to reverse the flow of pressurized fluid for rapid evacuation of the air bags, and to do so without blocking the valve assembly, and in which the fluid flow is throttled at the end of the fluid fill for smooth movement of the base.

I claim:

1. Vibration test apparatus comprising a base, fluid inflatable means for isolating said base from the floor at a predetermined desirable height, a pressurized fluid supply, and valve means carried by said base and positionally responsive to the height of said base to selectively communicate said fluid supply with said fluid inflatable means as a function of the position of said valve means when said base is less than said predetermined desirable height from the floor, said valve means comprising a valve body defining first and second ports and a fluid passage therebetween having a valve seat formed therein, said first port being in open communication with said pressurized fluid supply, said second port being in open communication with said inflatable means, a valve stem operable to control fluid flow through said valve body, said valve stem defining a plug selectively cooperating with said valve seat in passage fluid flow blocking relation, valve stem displacement means comprising a rigid element adapted to unseat said plug responsive to said base being a less than a desirable height from said floor to unblock said passage to fluid flow to said inflatable means for further inflation thereof, whereby said base is raised to said predetermined desirable height by further inflation of said fluid inflatable means.

2. Vibration test apparatus according to claim 1, including also a plurality of inflatable means distributed across said base, and valve means for each said fluid inflatable means, whereby each said inflatable means is independently communicated with said fluid supply by its respective valve for independent height adjustment of said base at each said inflatable means.

3. Vibration test apparatus according to claim 1, in which said inflatable means comprises an air impervious bag adapted to lift and support said base a predetermined distance from said floor.

4. Vibration test apparatus according to claim 1, including also means adjustably securing said valve body to said base.

5. Vibration test apparatus according to claim 1, including also a pressurized air supply as said pressurized fluid supply.

6. Vibration test apparatus according to claim 1, in which said inflatable means comprises an air impervious bag.

7. Vibration test apparatus according to claim 1, in which said pressurized fluid supply comprises a supply of compressed air.

8. Vibration test apparatus according to claim 7, in which said valve stem displacement means displaces said valve stem relative to said valve body for fluid flow into or out of said inflatable means as a function of the difference between the distance from the base to the floor and said predetermined distance, whereby said base is brought to said predetermined distance.

9. In combination: Valve means, fluid inflatable means and a pressurized fluid supply; said valve means comprising an axially extended valve body defining first and second axially spaced ports and a fluid passage therebetween having a transverse valve seat formed therein, said first port being in open communication with said pressurized fluid supply, said second port being in open communication with said inflatable means, an axially displaceable valve stem operable to control fluid flow through said valve body, said valve stem defining a plug selectively cooperating with said valve seat in passage fluid flow blocking relation, and valve stem displacement means, said valve stem displacement means comprising a rigid element axially extended from said valve stem, said rigid element extending from said valve body in shiftable relation between axially spaced predetermined positions responsive to contact with contacting means beyond said valve body, said valve stem plug having seating response to no contact of said rigid element with said contacting means beyond said valve body to block fluid flow through said passage against further inflation of said inflatable means, and unseating response to contact of said rigid element with said contacting means to unblock said passage to fluid flow from said fluid supply to said inflatable means for further inflation of said inflatable means.

10. Vibration test apparatus according to claim 9, in which said valve stem defines a flow passage between said inflatable means and the atmosphere, said rigid element being adapted open said stem flow passage to the atmosphere for deflation of said inflatable means.

11. Vibration test apparatus according to claim 10, including also means to limit the travel of said rigid element relative to said valve stem.

12. Vibration test apparatus according to claim 10, in which said valve stem is differentially dimensioned along its length below said plug for reduced rates of fluid flow responsive to increasing proximity of said plug to said valve seat.

13. Vibration test apparatus according to claim 10, including also an O-ring seal sealing said plug at said seat.

14. Vibration test apparatus according to claim 10, including also subatmospheric pressure means to withdraw fluid from said inflatable means through said valve body passage.

15. In combination: Valve means, fluid inflatable means, and a pressurized fluid supply, said valve means comprising a valve body defining first and second ports and a fluid passage therebetween having a valve seat formed therein, said first port being in open communication with said pressurized fluid supply, said second port being in open communication with said inflatable means, a valve stem operable to control fluid flow through said valve body, said valve stem defining a plug selectively cooperating with said valve seat in passage fluid flow blocking relation, valve stem displacement means comprising a rigid element operatively coupled to said valve stem, said rigid element extending from said valve body in external contact-shiftable relation, said valve stem plug having seating response to no external contact of said rigid element to block fluid flow through said passage against further inflation of said inflatable means, and unseating response to external contact of said rigid element to unblock said passage to fluid flow from said fluid supply to said inflatable means for further inflation of said inflatable means, and in communication with said valve body first port subatmospheric pressure means to withdraw fluid from said inflatable means through said valve body passage, said valve stem plug being ported against blocking said valve body first port.

16. In combination: a valve, and an air isolated base for vibration equipment, said base having air bags selectively maintaining the base a predetermined height from the floor for vibration isolation, and a pressurized air supply to said air bags, said valve controlling communication of said air supply and said air bags and comprising an axially extended valve body having a first port in open air supply communication, a second port in open air bag communication, and a valve body passage between said first and second ports defining a valve seat, an axially extended valve stem within said passage cooperating with said valve seat to open or close said valve body passage to communication between said first and second ports, a valve stem operator continuation of said valve stem responsive the height of the base from the floor being less or more than said predetermined height to open or close respectively said valve body passage, said valve stem operator comprising a rigid element extending from said valve body in floor contact shiftable relation, said valve stem having seating response to no floor contact of said rigid element to block air flow through said passage and unseating response to floor contact of said rigid element to unblock said passage to air flow, whereby air is admitted or not to said bags to maintain said base at said predetermined height from the floor.

17. In combination: A self-adjusting valve and a fluid pressure system comprising a fluid inflatable means, said valve comprising an axially extended valve body movably positioned above a surface, said valve body having first and second ports at selectively different fluid pressures and a valve body passage therebetween, said second port being adapted for open communication with said fluid inflatable means, said fluid inflatable means being desirably kept at a predetermined level of inflation, an axially extended valve stem bodily shiftable within said passage, and cooperating means defined by said passage and said stem for controlling fluid flow to and from said inflatable means, said valve stem having a rigid axial extension beyond said valve body adapted to contact or not contact said surface responsive to greater or lesser inflation of said fluid inflatable means to shift said valve stem axially to adjust fluid flow to achieve said predetermined level of inflation.

* * * * *